UNITED STATES PATENT OFFICE.

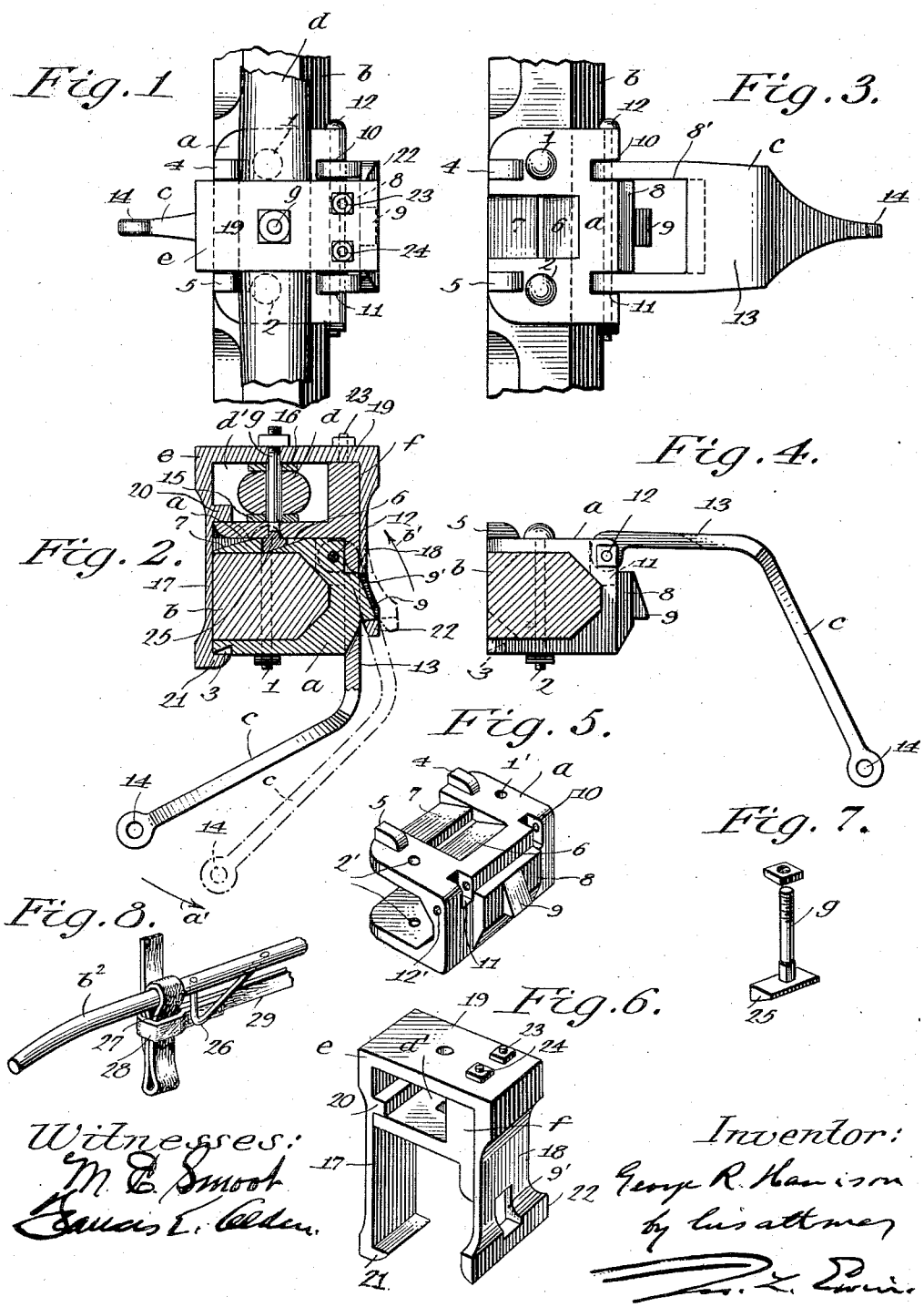

GEORGE R. HARRISON, OF PHILADELPHIA, PENNSYLVANIA, ASSIGNOR OF ONE-HALF TO WILLIAM NOTHAFT, OF PHILADELPHIA, PENNSYLVANIA.

HORSE-DETACHER.

1,018,707. Specification of Letters Patent. Patented Feb. 27, 1912.

Application filed December 26, 1911. Serial No. 667,678.

*To all whom it may concern:*

Be it known that I, GEORGE R. HARRISON, a citizen of the United States of America, and a resident of Philadelphia, in the State of Pennsylvania, have invented a new and useful Improvement in Horse-Detachers, of which the following is a specification.

This invention relates to those horse detachers for vehicles in which the swingletree or doubletree is detached, to free the animal or animals from the vehicle, in case of runaways and like emergencies; and the present invention consists in certain combinations of parts and in an improved whiffletree detaching device embodying the same, as hereinafter more particularly described and claimed.

The leading object of the invention is to provide for throwing off the whiffletree in a positive and reliable manner, so as to insure instantly freeing the draft animal or animals when there is occasion for the use of the detaching device.

Other objects will be set forth in the general description which follows.

The accompanying sheet of drawings shows the improved horse-detacher applied to the swingletree of a buggy or like one-horse vehicle.

Figure 1 is a fragmentary top view with the swingletree in normal or effective position; Fig. 2 is a sectional elevation projected down from Fig. 1, with dotted lines and arrows added to illustrate the detaching operation; Fig. 3 is a fragmentary top view, with the swingletree detached; Fig. 4 is a sectional elevation projected from Fig. 3; Fig. 5 is a perspective view of the main clip segregated; Fig. 6 is a perspective view of the swingletree attachment, segregated; Fig. 7 is a perspective view of the swingletree pivotal bolt and its nut, segregated; and Fig. 8 is a perspective view illustrating means for freeing the horse from the thills.

Like reference characters refer to like parts in all the figures.

The improved detaching device shown in the drawings includes a main clip, $a$, shown detached by Fig. 5, which is fixedly secured on the customary cross bar, $b$, of the thills $b^2$ by through bolts, 1 and 2, extending respectively through bolt holes $1'$ and $2'$, Fig. 5 in the bottom and top of the clip; of which the bottom is further preferably provided with an undercut edge portion, 3, shown in dotted lines in Fig. 4. The top of the clip is provided with a pair of upstanding lugs, 4 and 5, and between them with a central beveled depression, 6, and a bevel, 7, leading thereto; the vertical back of the clip is provided with a central main projection, 8, beveled at bottom, and thereon a locking projection, 9, beveled at top; and the clip is further provided with hinge recesses 10 and 11 at its top angle and a horizontal bolt-hole, $12'$, extending therethrough for a pivot bolt 12. Said pivot bolt 12 permanently attaches to the clip $a$, a bent lever, $c$, having near the pivot a flat lifting portion, 13, and at its extremity an eye, 14, or its equivalent for a cord or the like by which to pull the lever from the driver's seat; and said flat portion 13 is provided with a rectangular opening, $8'$, Fig. 3, fitted to said projection 8 on the back of the clip, as means for preventing lateral displacement when the swingletree $d$, with its attachment is in place, and the parts are in their normal positions as in Fig. 1 and in full lines in Fig. 2. Said attachment for the swingletree $d$, segregated by Fig. 6, consists of an outer U-shaped clip, $e$, of spring steel, and an inner piece, $f$, bolted fast thereto, with an interspace, $d'$, Fig. 6, adapted to accommodate the swingletree $d$, which is permanently pivoted therein between washers 15 and 16, Fig. 2, by a vertical bolt, $g$, and its nut, segregated by Fig. 7. Said outer clip, $e$, has front and back spring portions, 17 and 18, Fig. 6, connected by a rigid top portion, 19; said front portion 17 is provided on its back with a ledge, 20, to interact with the front end of said inner piece $f$, and terminates at bottom in a beveled locking lip, 21, which interlocks with the bottom of the main clip $a$ at said undercut edge 3, Fig. 4; said back portion 18 is constructed with a beveled and reinforced lower end 22 provided with a catch-hole, $9'$, to interlock with said locking projection 9 on the back of the main clip $a$; and said top portion 19 is simply provided, in common with said inner piece $f$, with the required bolt-holes for said pivot bolt $g$ and the bolts 23 and 24 which unite the two pieces. Said inner piece $f$ is fitted to the space between the upstanding lugs 4 and 5 on the top of the main clip $a$, and is simply adapted to form the bottom of said swingletree space $d'$ within the outer clip $e$; being bolted fast within said outer clip as aforesaid at its rear end, and interacting at its front end with said ledge 20. Said pivot bolt $g$ is conveniently forged with a beveled head, 25, Fig. 7, fitted to said bevel 7 and depression 6 in the top of the main clip $a$, to resist draft strains on the swingletree $d$.

The parts being assembled as in Figs. 1 and 2, and the lever $c$ being in its normal position as shown in Fig. 1 and in full lines in Fig. 2, if a runaway or the like occurs, the driver pulls said lever $c$ as represented by the arrow $a'$, Fig. 2. The first effects, represented by dotted lines at $c$ and 18 in Fig. 2, are to free the lever $c$ from said projection 8 on the back of the main clip $a$ and to unlock the spring back portion 18 from the locking projection 9 on said back of the main clip by the first interaction of the flat portion 13 of the lever $c$ with the rounded lower end of said back portion 18. An instant later, as represented by the arrow $b'$, Fig. 2, the swingletree attachment as a whole, and therewith the swingletree $d$, is thrown upward and forward clear of the main clip $a$, aided by the pull of the animal and the inertia of the vehicle with its load. In this detaching movement, the positive action throughout of the lever $c$ is important and essential; while the resiliency of the front and back portions of the outer clip adapts the swingletree attachment to be turned on said undercut locking edge 3 as a pivot, without binding or strain. Said swingletree attachment and the main clip interlock automatically in assembling the parts.

The animal may be freed from the thills in any known or improved way; as, for example, by substituting a suitable hold-back, 26, Fig. 8, on each thill, a thill-embracing loop, 27, on the belly band at each side, and a loop, 28, embracing the belly band at the front end of each trace, 29, for the more common thill and harness connections at this point.

The parts of the improved detaching device, apart from the outer clip $e$, may be of any suitable metal; the device may obviously be adapted to a doubletree or to each of a pair of swingletrees in substantially the same manner; and other like modifications will suggest themselves to those skilled in the art.

Having thus described said improvement, I claim as my invention, and desire to patent under this specification:

1. A horse detacher having, in combination, a main clip constructed with bottom and top portions and a back portion, bolts interacting with said bottom and top portions, a whiffletree attachment constructed with front and back spring portions adapted to interlock with said main clip, and a lever pivoted to said main clip at its back and adapted to interact with said whiffletree attachment to disengage and separate the same from said main clip and thereby detach the whiffletree.

2. A horse detacher having, in combination, a main clip constructed with bottom and top portions and a back portion, said bottom portion having an undercut front edge, bolts interacting with said bottom and top portions, a whiffletree attachment constructed with front and back spring portions adapted to interlock with said main clip at its back and pivotally at said undercut edge, and a lever pivoted to said main clip at its back and adapted to interact with said whiffletree attachment to disengage and separate the same from said main clip and thereby detach the whiffletree.

3. A horse detacher having, in combination, a main clip constructed with a back portion provided with a locking projection beveled at top, a whiffletree attachment constructed with front and back spring portions, the latter provided with a catch-hole adapted to interlock with said projection, and a lever pivoted to said main clip and having a flat portion to interact with said back spring portion to disengage the same from said locking projection.

4. A horse detacher having, in combination, a main clip constructed with a back portion provided with a projection beveled at bottom carrying a locking projection beveled at top, a whiffletree attachment constructed with front and back spring portions, the latter provided with a catch-hole adapted to interlock with said projection, and a lever pivoted to said main clip and having a flat portion cut away to interact with the projection first named to resist lateral displacement, an adjoining part of said flat portion being adapted to interact with said back spring portion to disengage the same from said locking projection.

5. A horse detacher having, in combination, a main clip constructed with bottom and top portions and a back portion, bolts interacting with said bottom and top portions; a whiffletree attachment composed of an outer spring clip adapted to interlock with said main clip, and an inner piece; a vertical pivot bolt for the whiffletree extending upward through said inner piece and the top of said outer clip and constructed with a beveled head at its lower end; and a lever pivoted to said main clip and adapted to interact with said whiffletree attachment to disengage the same from said main clip and thereby detach the whiffletree; the top of said main clip being recessed to interact with said beveled head of said pivot bolt to resist draft strains, substantially as hereinbefore specified.

GEORGE R. HARRISON.

Witnesses:
M. E. SMOOT,
JAS. L. EWIN.

Copies of this patent may be obtained for five cents each, by addressing the "Commissioner of Patents, Washington, D. C."